United States Patent Office 2,962,525
Patented Nov. 29, 1960

2,962,525

PRODUCTION OF ACRYLIC ACID AND ESTERS THEREOF

Philip C. Johnson and Fred W. Stone, Charleston, and Leo V. McQuillen, South Charleston, W. Va., assignors to Union Carbide Corporation, a corporation of New York No Drawing. Filed May 2, 1958, Ser. No. 732,462

8 Claims. (Cl. 260—486)

This invention relates to a chemical process and more particularly to a process for the production of esters of acrylic acid.

The formation of acrylic acid or its derivatives by the carboxylation of acetylene with nickel carbonyl in the presence of an acid and an active hydrogen compound was discovered by J. W. Reppe, and can be illustrated by the following equation which hereinafter is referred to as the "stoichiometric process."

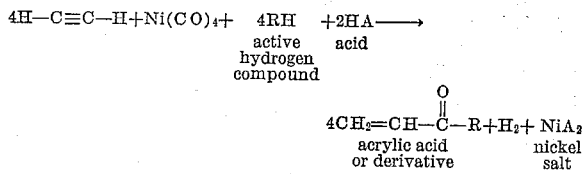

Depending on the particular active hydrogen compound chosen, either acrylic acid, or an acrylic ester can be produced. R in the above equation is the residue of an active hydrogen compound. Examples of such active hydrogen compounds suitable for the above reaction are the alcohols, amines, amides, mercaptans, ammonia, hydrogen sulfide, water and the like. A is either an organic carboxylate radical such as formate, acetate, propionate and the like or an inorganic ion such as chloride, sulfate, nitrate and the like. Reppe later discovered that organic acids or mixtures of organic and inorganic acids could serve as reactants to promote the stoichiometric process. A still further modification of the process came about with the use of halogens as oxidizing agents in the reaction in place of either the organic or inorganic acids. In addition to acetylene itself the disubstituted acetylenes were found to react by this process.

A major refinement of the stoichiometric process was made whereby a reaction between acetylene, carbon monoxide and an active hydrogen compound is effected when run simultaneously with the stoichiometric process. This is known as the "superimposed process" since a catalytic reaction is superimposed on the stoichiometric process.

Although many methods and modifications of the stoichiometric process have been investigated for the preparation of acrylic acid and its derivatives, no completely satisfactory method has been found. For example, the refining of the reaction product in all cases of ester formation except those conducted in a large excess of low molecular weight alcohol such as methyl or ethyl alcohol involves the preliminary removal of precipitated nickel salts by filtration. Additionally, the use of excess alcohol in the synthesis of acrylic acid esters gives rise to a difficult separation problem. The formation of azeotropic mixtures by the esters of acrylic acid and the corresponding alcohol renders the separation of the ester from the alcohol and other reaction products exceedingly difficult.

Applicants have discovered a method for producing esters of acrylic acid wherein the problems of the earlier methods are eliminated. The present invention involves a process for the production of esters of acrylic acid which comprises conducting the stoichiometric process in a reaction media comprising water and an inert organic solvent in such a manner that the reaction mixture will consist of a heterogeneous mixture containing immiscible organic and aqueous phases. By maintaining the particular active hydrogen compound in the reaction media in less than a stoichiometric amount it can be exhaustively reacted with the acetylene and nickel carbonyl and the deficiency in active hydrogen compound supplied by the water which is dispersed throughout the mixture. Thus, the products of the reaction are the desired ester of acrylic acid as well as acrylic acid itself. The acid has been formed when the acetylene and nickel carbonyl react with water after all the alcohol has been consumed in forming the ester. In this manner, both the ester and acrylic acid are coproduced in the same operation.

The advantages inherent in operating the process as indicated are numerous. The principal advantage of the present invention is the improved separation of the products of the reaction. The troublesome separation of the product ester from unreacted alcohol can be largely eliminated by adding to the reaction mixture less than the required or stoichiometric amount of alcohol and then, by choice of solvent, operating so as to exhaustively react the alcohol, converting it all to ester. The separation of alcohol-ester is thus replaced by a separation of ester-acid which can be more easily effected.

An outstanding advantage over the conventional method of operation provided by this invention is the elimination of the necessity of handling precipitated nickel salts in the reactor. In the conventional production of acrylic acid esters of alcohols of higher molecular weight than ethyl and methyl, the reaction is accompanied by the precipitation of nickel salts. Due to the formation of this precipitate, it is necessary to use reactors capable of handling slurries of solids in liquids. Additionally, the precipitation of nickel salts also tends to occur on cooling surfaces inside the reactors, decreasing the heat transferability of the cooling surface, and necessitating frequent cleaning with the resulting loss of production time. Provision must be made for removal of the precipitate by filtration. The presence of an aqueous phase in the reactor which will hold nickel salts in solution will eliminate each of these disadvantages.

A further advantage in the present invention is that the aqueous mineral acids, especially the hydrogen halides, are often more readily available and more economical to use. This process will enable the coproduction of acrylic acid and esters of acrylic acid using aqueous solutions of these mineral acids.

In the operation of this process, acrylic acid and an ester of acrylic acid are coproduced by the reaction of nickel carbonyl with acetylene in the presence of an acid, less than an equivalent amount of alcohol and a large excess of water. Also present in the reaction mixture is an organic solvent which is immiscible with water. This entire reaction mixture is agitated during the course of the reaction. The reactants and products will distribute themselves between the two phases depending on their solubilities. Due to the preferential solubility of acetylene and nickel carbonyl in organic solvents as compared to water, the reaction occurs primarily in the organic phase. Likewise, the solubilities of alcohols, especially high molecular weight alcohols, in organic solvents compared with the limited solubility of water in the organic phase insure that the alcohol will be the preferential active hydrogen compound. Consequently, if the alcohol present in the reaction mixture is limited, that is, not present in sufficient quantity to supply all the requirement for an active hydrogen compound, then the alcohol is essentially completely converted to ester, and the water which is always present in excess supplies any additional active hydrogen requirement.

Intimate mixing of the two liquid phases is essential for the successful operation of this method. Efficient agitation of the reaction mixture provides for the continuous transfer of reactants which have a high affinity for water from the aqueous phase to the organic phase. In addition, the intimate mixing provides water to the organic phase continuously, where it acts as an active hydrogen compound as needed, and also provides for the constant solubilizing and extraction of the nickel salt produced in the process into the aqueous layer. The term "heterogeneous reaction media" is used herein to include the intimate mixing of the two liquid phases as indicated above.

Distribution of products between the two phases at any stage of the reaction will depend upon the organic solvent used and the ester produced. For the most part, it can be stated that the acrylic acid and the ester produced as well as unreacted alcohol will predominate in the organic phase, while the excess mineral acid as well as the nickel salt will predominate in the aqueous phase.

Coproduction of the acrylic acid and acrylic acid ester by the process of this invention can be effected by any conventional apparatus which will provide a continuous and intimate agitation of the reaction mixture so as to ensure thorough dispersion of the two liquid phases, and allow introduction of the reactants, and withdrawal of the products without shutting down the unit. In a preferred form of the process, reactants are fed to the system continuously, and reaction mixture is continuously removed. Since the efficient agitation of the reaction mixture would give rise to the continuous removal of unconverted reactants, it was found expedient to operate the process in a series of stirred reactors. In order to exhaustively react the alcohol feed, at least four and preferably five reactors can be used. The reaction mixture from the first reactor is fed to the second where additional nickel carbonyl and acetylene are introduced. This procedure is continued through the remaining reactors. In the final reactor, the mixture is treated with acetylene only to insure exhaustive reaction of nickel carbonyl.

For continuous operation, the present invention permits a change in the ester produced without an attendant shutdown of the reaction, or a production of an unrefinable intermediate mixture of two esters. During continuous operation, it is possible to stop the feed of an alcohol, continuing the operation of the system to produce acrylic acid only. Then after sufficient time has been allowed to elapse to insure that the alcohol and ester have been purged from the system, a second alcohol can be fed to the system to re-establish acid-ester coproduction.

Any inert organic liquid that is both water-immiscible and recoverable by distillation can be employed as the organic media for purposes of this invention. Additionally, organic liquids which, although miscible with water, are not miscible with nickel salt brines containing ten percent or more of the nickel salt by weight are also applicable. Typical solvents which can be used as the organic media are hydrocarbons, aromatic and aliphatic and arylalkyl all being applicable, for example benzene, toluene, ethylbenzene, pentane, hexane, heptane, and higher boiling alkanes. Also applicable are olefins such as hexene, cyclohexene, and the higher boiling olefins. Additionally, cycloparaffins are also applicable in the practice of this invention. Other compounds which can be used include ethers such as diethyl ether, diisopropyl ether, tetrahydrofuran and dioxane. Ketones, such as acetone and methyl ethyl ketone are likewise useful. Although dioxane and acetone are miscible with water they are not miscible with inorganic brines and consequently form two liquid phases in the operation of this process.

Esters are also applicable in the practice of this invention, and can include the esters of acrylic acid such as methyl acrylate, ethyl acrylate, butyl acrylate, and 2-ethylhexyl acrylate in addition to the esters of saturated acids such as acetic acid esters including ethyl acetate, and higher esters. The esters of higher carboxylic acids are also applicable. It is also possible to use high-molecular weight alcohols without additional organic solvents, the organic phase in the reactor then being composed of a mixture of alcohol and acrylic acid ester of the alcohol. On completion of the reaction, substantially all of the alcohol will have been converted to ester.

The efficiency of the exhaustive reaction of alcohol will be determined to a large extent by the choice of the organic solvent. If water-miscible solvents are used with low molecular weight alcohols, the conversion of alcohol to ester will not be high due to the high concentration of water in the organic phase, which makes the production of acid more competitive with the production of ester. The higher molecular weight alcohols which are in themselves water-immiscible are more efficiently converted to esters.

In the practice of this invention the acids used can be either mineral or organic or mixtures of both. The mineral acids can include the hydrogen halides, while the organic acids include saturated and unsaturated carboxylic acids of four carbon atoms or less.

The water-miscible alcohols employed in the process of this invention are those alkanols such as methyl, ethyl, n-propyl and isopropyl alcohols. Also applicable are water-immiscible alcohols such as alkanols of four or more carbon atoms, both branched and straight chained, and both primary and secondary alcohols. The use of other alcohols containing other functional groups are applicable, provided such functional groups are unreactive under the conditions of this process.

A temperature range of 20° C. to 100° C. is permissible for the practice of this invention with a preferred range of 40° C. to 55° C.

The following examples are given by way of illustration; unless otherwise specifically noted all parts are by weight.

*Example I*

Into a vessel equipped with both gas inlet and outlet tubes, an efficient cooling system and a high speed stirrer a solution was introduced containing 172.5 parts of hydrogen chloride and 160 parts of ethyl alcohol in 587.5 parts of water. This solution was then charged with 950 parts of ethylbenzene. Nickel carbonyl was admitted to the system at a rate of 108 parts per hour for a three hour period and acetylene was similarly admitted to the reaction mixture at a rate of 125 parts per hour. A gradual change in the color of the mixture from dark brown to green occurred with the simultaneous liberation of heat from the reaction. Cooling was required to maintain the reaction temperature between 25° and 45° centigrade. The addition of acetylene was continued after all the nickel carbonyl was admitted to the system until the gas was no longer absorbed. The mixture separated into an aqueous and organic layer. The aqueous layer consisted of 925 parts containing 247 parts of nickel chloride, 42 parts of hydrogen chloride and 15 parts of acrylic acid and the balance water while the organic layer, 1464 parts, was composed of 201 parts of acrylic acid, 233 parts of ethyl acrylate and the balance ethylbenzene, dissolved water, gases and reaction by-products. Conversion to $\alpha,\beta$-unsaturated carbonyl compound was 72.8 percent based on nickel carbonyl.

Extraction of acrylic acid from the organic layer was effected by washing with aqueous sodium carbonate. On drying the organic layer, it was fractionally distilled and the ethyl acrylate collected at 98° to 100° centigrade at a pressure of 760 millimeters. No unreacted alcohol was recovered.

Example II

A solution of 172.5 parts of hydrogen chloride, 287 parts of ethanol, 535 parts of water and 620 parts of pentane was added to a vessel equipped similarly to that described in Example I. Nickel carbonyl was admitted to the vessel continuously for a three hour period at a rate of 108 parts per hour, and acetylene was introduced at a rate of 125 parts per hour. By external cooling, the reaction temperature was maintained at 35° centigrade. Upon completion of the reaction, the aqueous phase was found to contain 11 parts of acrylic acid while the organic phase contained 104 parts of the acid and 375 parts of ethyl acrylate giving a combined yield of 70.2 percent based on nickel carbonyl.

Example III

A reaction vessel similar to that used in Example I was charged with 172.5 parts of hydrogen chloride, 723 parts of primary decyl alcohols, 535 parts of water and 300 parts of isopropyl ether. Over a three hour period nickel carbonyl was continuously added to the system at a rate of 108 parts per hour, and acetylene introduced at a rate of 110 parts per hour. The reaction temperature was maintained at from 45° to 50° centigrade. Upon completion of the reaction, the aqueous phase was found to contain 12.5 parts of acrylic acid while the organic phase contained 177 parts of acrylic acid and 760 parts of decyl acrylate, for a total conversion to acrylic acid and decyl acrylate of 82 percent based on nickel carbonyl. No unreacted alcohol was recovered from the products.

Example IV

To a reaction system similar to that described in the previous examples 172.5 parts by weight of hydrogen chloride, 806 parts of 2-ethylhexyl alcohol, 535 parts of water and 500 parts of 2-ethylhexyl acrylate were added. Thereafter 324 parts of nickel carbonyl and 375 parts of acetylene were introduced continuously into the reaction mixture at a constant rate over a three hour period. The mixture was maintained between 45° and 50° centigrade during the course of the reaction. Conversion of the alcohol to $\alpha,\beta$-unsaturated carbonyl compounds was found to be 99 percent. The 2-ethylhexyl acrylate represented a 60.2 percent yield based on nickel carbonyl, while the acrylic acid represented 13.1 percent yield.

Example V

A mixture of 171 parts by weight of hydrogen chloride, 535 parts of water, 160 parts of ethanol and 950 parts of tetrahydrofuran was added to the previously described reaction system. When this mixture was reacted with 332 parts of nickel carbonyl and 412 parts of acetylene over a three-hour period the nickel carbonyl was converted to 66.8 percent yield of acrylic acid and 8.5 percent yield of ethyl acrylate.

Example VI

For continuous operation and in order to exhaustively react the alcohol feed at least four and preferably five reactors are required. In this example, a reaction system was employed which consisted of four vessels connected in series, each equipped with efficient stirring devices, gas inlet and outlet tubes, and liquid inlet and outlet tubes, with the final reactor connected to a collection vessel. To the first reactor a mixture was added at a rate per hour of 218 parts of ethyl alcohol, 1610 parts of water, 1730 parts of isopropyl ether, 226 parts of hydrogen chloride, 153 parts of nickel carbonyl and 177.5 parts of acetylene. The reaction mixture was continuously being withdrawn to the second reactor where nickel carbonyl and acetylene were added at 153 parts and 177.5 parts per hour respectively. From the second reactor the mixture was passed into the third reactor where nickel carbonyl and acetylene were again added at the same rates for the second reactor. The reaction mixture was then passed into the fourth reactor where the mixture was again treated with acetylene at a rate of 100 parts by weight per hour. Throughout the system the temperature was maintained within a range of from 40° to 60° centigrade.

The product from the fourth reactor consisted of an aqueous and an organic phase. Analysis showed that the aqueous phase contained, in addition to water and nickel chloride, acrylic acid, 46 parts per hour, and ethanol, 7.5 parts per hour. In the organic phase was found; ethyl acrylate at a rate of 191 parts per hour, acrylic acid at 520 parts per hour and unreacted ethyl alcohol at 19 parts per hour. The yield of acrylic acid and ester was 82 percent based on nickel carbonyl.

Example VII

In the first reactor of the system described in Example VI, 1017 parts per hour of 2-ethylhexyl alcohol, 1610 parts per hour of water, 1730 parts per hour of isopropyl ether, 226 parts per hour of hydrogen chloride, 148 parts per hour of nickel carbonyl and 182 parts per hour of acetylene were introduced. In the second and third reactors the reaction mixture from the preceding reactor was treated with 148 parts per hour of nickel carbonyl and 182 parts per hour of acetylene, and in the fourth reactor in series the reaction mixture was treated with 100 parts per hour of acetylene. The conversion of alcohol was 92 percent and the yield of acrylic acid and 2-ethylhexyl acrylate was 82.3 percent based on nickel carbonyl.

What is claimed is:

1. A process for the production of an ester of acrylic acid which comprises reacting acetylene with nickel carbonyl, an acid and less than a stoichiometric amount of an alkanol in a two-liquid phase reaction medium comprising water and an organic solvent immiscible with water, said water and organic solvent being intimately mixed whereby the alkanol reacts to yield the ester and the remaining acetylene and nickel carbonyl yield acrylic acid by reacting with the water present in the medium.

2. A process for the production of an ester of acrylic acid which comprises reacting acetylene with nickel carbonyl, an acid and less than a stoichiometric amount of an alkanol in a two-liquid phase reaction medium comprising water and an organic solvent immiscible with water, said water and organic solvent being intimately mixed at a temperature of from about 20° C. to about 100° C. whereby the alkanol reacts to yield the ester and the remaining acetylene and nickel carbonyl yield acrylic acid by reacting with the water present in the medium.

3. A process for the production of an ester of acrylic acid which comprises reacting acetylene with nickel carbonyl, an acid and less than a stoichiometric amount of an alkanol in a two-liquid phase reaction medium comprising water and an organic solvent immiscible with water, said water and organic solvent being intimately mixed at a temperature of from about 40° C. to about 55° C. whereby the alkanol reacts to yield the ester and the remaining acetylene and nickel carbonyl yield acrylic acid by reacting with the water present in the medium.

4. A process for the production of ethyl acrylate, which comprises reacting acetylene with nickel carbonyl, hydrogen chloride and less than a stoichiometric amount of ethyl alcohol in a two-liquid phase reaction medium comprising water and ethylbenzene, said water and ethylbenzene being intimately mixed.

5. A process for the production of ethyl acrylate which comprises reacting acetylene with nickel carbonyl, hydrogen chloride and less than a stoichiometric amount of ethyl alcohol in a two-liquid phase reaction medium comprising water and pentane said water and pentane being intimately mixed.

6. A process for the production of decyl acrylate which comprises reacting acetylene with nickel carbonyl, hydrogen chloride and less than a stoichiometric amount of primary decyl alcohol in a two-liquid phase reaction medium comprising water and isopropyl ether, said water and isopropyl ether being intimately mixed.

7. A process for the production of 2-ethylhexyl acrylate, which comprises reacting acetylene with nickel, carbonyl, hydrogen chloride and less than a stoichiometric amount of ethylhexyl alcohol in a two-liquid phase reaction medium comprising water and 2-ethylhexyl acrylate said water and 2-ethylhexyl acrylate being intimately mixed.

8. A process for the production of ethyl acrylate, which comprises reacting acetylene with nickel carbonyl, hydrogen chloride and less than a stoichiometric amount of ethyl alcohol in a two-liquid phase reaction medium comprising water and tetrahydrofuran said water and tetrahydrofuran being intimately mixed.

References Cited in the file of this patent

FOREIGN PATENTS 872,341     Germany _____ Mar. 30, 1953